United States Patent
Kang et al.

(10) Patent No.: US 8,437,952 B2
(45) Date of Patent: May 7, 2013

(54) NAVIGATION SYSTEM AND METHOD OF RECOGNIZING TRAFFIC LANE USING THE SAME

(75) Inventors: Woo Yong Kang, Daejeon (KR); Eun Sung Lee, Daejeon (KR); Moon Beom Heo, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 230 days.

(21) Appl. No.: 13/010,208

(22) Filed: Jan. 20, 2011

(65) Prior Publication Data

US 2011/0282577 A1 Nov. 17, 2011

(30) Foreign Application Priority Data

May 12, 2010 (KR) ........................ 10-2010-0044306

(51) Int. Cl.
*G01C 21/02* (2006.01)
(52) U.S. Cl.
USPC .......................................................... 701/409
(58) Field of Classification Search .................. 701/208
See application file for complete search history.

(56) References Cited

FOREIGN PATENT DOCUMENTS

| JP | 10-300494 A | 11/1998 |
|---|---|---|
| JP | 2008-32500 A | 2/2008 |

*Primary Examiner* — Thomas Tarcza
*Assistant Examiner* — Maceeh Anwari
(74) *Attorney, Agent, or Firm* — Jefferson IP Law, LLP

(57) ABSTRACT

Provided are a navigation system and a method of recognizing a traffic lane using the same. The navigation system includes an electronic map in which information about roads and spatial data of topographical features around roads are stored, a satellite navigational device that calculates a position and a transverse point of a vehicle on the road using satellite navigation information and the road information, a radio communication unit that receives information about positions of the navigational satellites from a base station, and a lane recognition unit that calculates the number of lane-specific visible satellites and the number of real visible satellites on the basis of information about a lane position of the electronic map, spatial data of the topographical feature located at the transverse point, and the position information of the navigational satellites, and that compares the number of lane-specific visible satellites with the number of real visible satellites to recognize a lane along which the vehicle is traveling. Thus, there are no restrictions in the aspects of installation and maintenance, and accurate lane recognition is possible without an influence on the weather conditions around the road.

10 Claims, 6 Drawing Sheets

NAVIGATION SYSTEM AND METHOD OF RECOGNIZING TRAFFIC LANE USING THE SAME

CROSS-REFERENCE TO RELATED APPLICATION

This application claims priority to and the benefit of Korean Patent Application No. 10-2010-0044306, filed on May 12, 2010, the disclosure of which is incorporated herein by reference in its entirety.

BACKGROUND

1. Field of the Invention

The present invention relates to a navigation system capable of recognizing a traffic lane of a vehicle that is traveling on a road, and a method of recognizing a traffic lane using the same.

2. Discussion of Related Art

In general, navigation systems applied to vehicles are devices that guide a driver along a roadway from an origin to a destination. The driver drives to the destination while looking at a map displayed on a terminal of the navigation system and/or while listening to sounds from the terminal of the navigation system. This navigation system combines information about positions of navigational satellites with spatial data of an electronic map, thereby displaying a position of a vehicle on a road represented by the map.

Such a navigation system, however, does not yet inform the driver of the position of a roadway (lane) along which the vehicle is traveling. That is, the navigation system merely guides left turns and right turns with respect to traffic lanes, and performs no guidance on the basis of the position of the lane along which the vehicle is traveling. For example, no navigation system provides guidance for lane changing when the driver of a vehicle, which is traveling along a lane other than the leftmost lane, intends to make a left turn. Thus, the driver suffers the inconvenience of checking a surrounding position of the navigation system, a position of the real road, and a current traffic lane, and then attempting the lane changing.

To eliminate this inconvenience, there are proposals for a method of burying a radio frequency identification (RFID) sensor in a road, a method of recognizing a lane using a camera, and so on.

However, in the case of the lane recognition using the RFID sensor, the RFID sensor must be buried in the entire road, and thus there is a limitation in the aspects of installation and maintenance. Further, radio communication should be used, and thus a recognition rate is dependent on surrounding weather and a speed of the vehicle.

In the case of the lane recognition using the camera, this has mainly been developed for lane departure warnings, and thus only the lane can be recognized. As such, it is almost impossible to know along which lane a vehicle travels. Further, when the road is covered with snow or is veiled in fog, the lane recognition is impossible.

SUMMARY OF THE INVENTION

Therefore, a method of recognizing a roadway (lane) along which a vehicle is traveling using information about positions of navigational satellites and spatial data of surroundings of a road, and a navigation system using the method are being demanded.

One aspect of the present invention provides a method of recognizing a traffic lane using a navigation system. The method comprises: calculating a position and a transverse point of a vehicle on a road using satellite navigation information and road information of an electronic map; calculating the number of lane-specific visible satellites and the number of real visible satellites on the basis of information about a lane position of the electronic map, data of topographical features located at the transverse point, and information about positions of the navigational satellites received by a base station; and comparing the number of lane-specific visible satellites with the number of real visible satellites to recognize a lane along which the vehicle is traveling.

Calculating the number of lane-specific visible satellites and the number of real visible satellites may include: calculating a lowest altitude angle of the visible navigational satellite; calculating altitude angles of the navigational satellites with respect to the vehicle; and comparing the lowest altitude angle with the altitude angles of the navigational satellites.

The number of lane-specific visible satellites may be set to a number of the navigational satellites meeting a condition that the altitude angle of the navigational satellite is greater than the lowest altitude angle.

The lowest altitude angle may be determined by a position of the vehicle, a position of the topographical feature located at the transverse point, and a height of the topographical feature; and the altitude angles of the navigational satellites may be determined by the position of the vehicle and positions of the navigational satellites.

The number of lane-specific visible satellites may be calculated by projecting a position of the vehicle on each lane of the road.

The method may further include determining a travel direction of the vehicle using information about a bygone position of the vehicle and the road information when the road includes two-way lanes.

Another aspect of the present invention provides a navigation system, which comprises: an electronic map in which information about roads and spatial data of topographical features around roads are stored; a satellite navigational device that calculates a position and a transverse point of a vehicle on the road using satellite navigation information and the road information; a radio communication unit that receives information about positions of the navigational satellites from a base station; and a lane recognition unit that calculates the number of lane-specific visible satellites and the number of real visible satellites on the basis of information about a lane position of the electronic map, spatial data of the topographical feature located at the transverse point, and the position information of the navigational satellites, and that compares the number of lane-specific visible satellites with the number of real visible satellites to recognize a lane along which the vehicle is traveling.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

Hereinafter, a navigation system and a method of recognizing a traffic lane using the same according to an exemplary embodiment of the present invention will be described below in greater detail with reference to the accompanying drawings.

Figure 1:
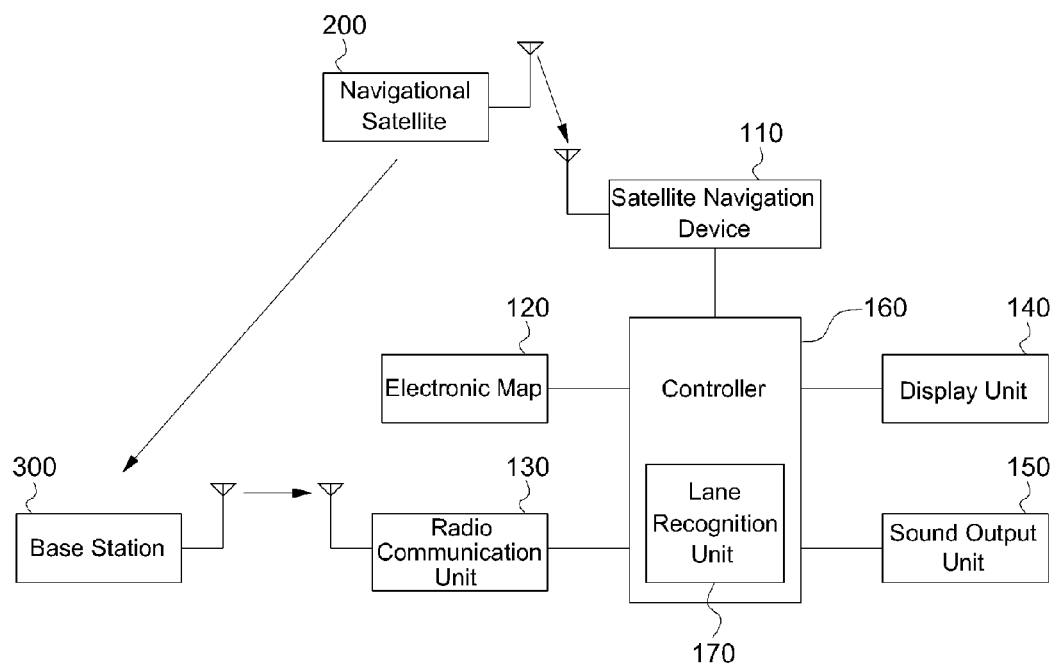
FIG. 1 is a block diagram showing a navigation system according to an exemplary embodiment of the present invention.
Figure 2:
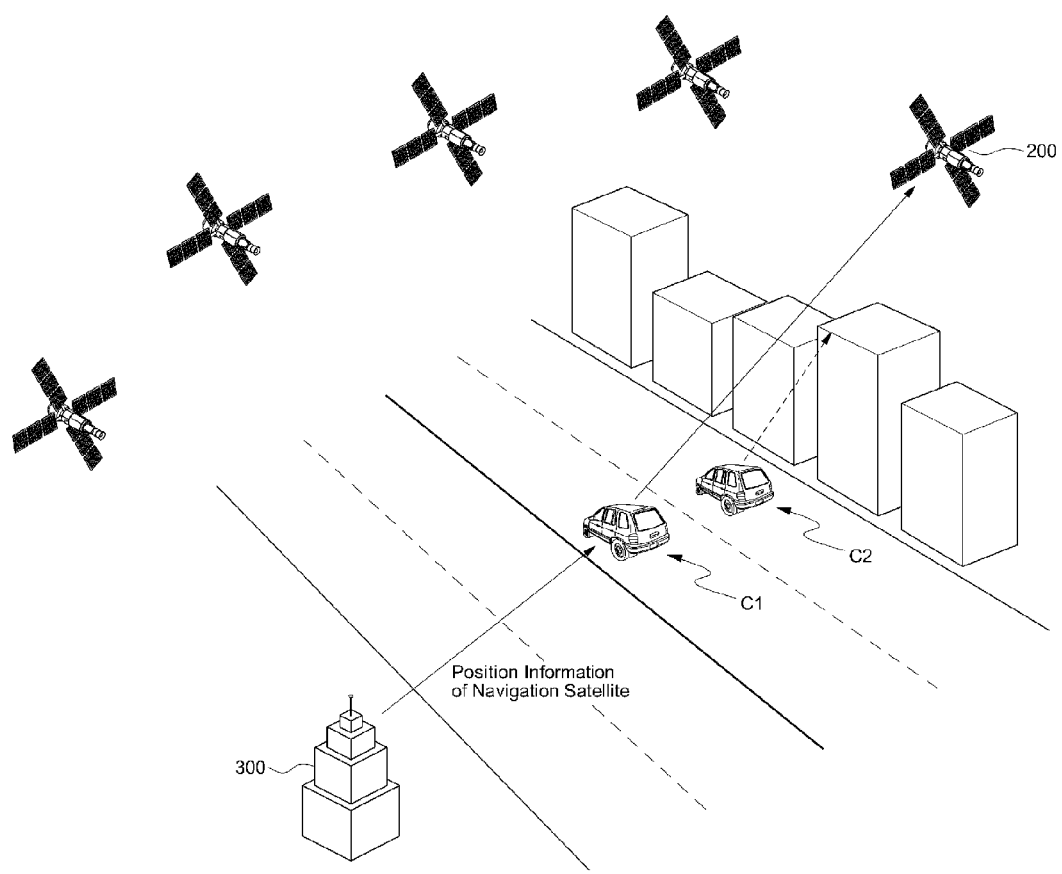
FIG. 2 is a conceptual view showing a method of recognizing a traffic lane using the navigation system of FIG. 1.

FIG. 1 is a block diagram showing a navigation system according to an exemplary embodiment of the present invention, and FIG. 2 is a conceptual view showing a method of recognizing a traffic lane using the navigation system of FIG. 1.

Referring to FIG. 1, the navigation system includes a satellite navigation device 110, an electronic map 120, a radio communication unit 130, a display unit 140, a sound output unit 150, and a controller 160. These components may be installed in a navigation terminal.

The satellite navigation device 110 refers to a device for calculating a position of a vehicle on the basis of navigational data transmitted from at least one navigational satellite, and is generally called a global positioning system (GPS) module.

The electronic map 120 is for storing spatial data of topographical features of a road and its surroundings, i.e. geographic information system (GIS) data, and generally has the form of a memory. According to the present invention, the electronic map 120 employs a precise electronic map in which detailed spatial data such as information about lanes of a road, buildings around the road, roadside trees, etc. are stored.

The radio communication unit 130 functions to receive a position of the navigational satellite 200 from a base station 300. Further, the radio communication unit 130 receives correction information for calculating an accurate position from the base station 300.

The display unit 140 and the sound output unit 150 output guide information in the form of visual or acoustic information. For example, the display unit 140 outputs the spatial information stored in the electronic map 120 in the form of a map, and displays a travel roadway on the map. The sound output unit 150 outputs sounds associated with go, left turn, right turn, and so on.

The controller 160 controls operation of the display unit 140 and/or the sound output unit 150 on the basis of the data transmitted from the satellite navigation device 110, the radio communication unit 130, and so on.

The navigation system of the present invention further includes a lane recognition unit 170 for recognizing a lane along which a vehicle is traveling. In this embodiment, the lane recognition unit 170 may be integrally formed with the controller 160 in the form of an algorithm or a program. However, the present invention is not limited to this construction. For example, the lane recognition unit 170 may be provided independently of the controller 160.

The lane recognition unit 170 recognizes the traffic lane of a vehicle using the position information of the navigational satellite and the spatial data of the electronic map. The controller 160 controls the display unit 140 and/or the sound output unit 150 to output guide information about lane changing on the basis of a result of the lane recognition of the lane recognition unit 170. For example, if the traffic lane is not the leftmost lane when the left turn must be made, the controller 160 may guide the vehicle so as to change the traffic lane into the leftmost lane.

FIG. 2 shows that two vehicles C1 and C2 are traveling on a two-way four-lane road. One vehicle C1 is traveling along a left lane, and the other vehicle C2 is traveling along a right lane. Here, a low-altitude navigational satellite shows a difference in visibility between the left lane and the right lane. In detail, the low-altitude navigational satellite can observe the vehicle on the left lane, but not on the right lane due to the interruption of surrounding buildings. The present invention proposes a method of recognizing the traffic lane of a vehicle using this difference in visibility. Hereinafter, the method of recognizing the traffic lane will be described in detail.

Figure 3:
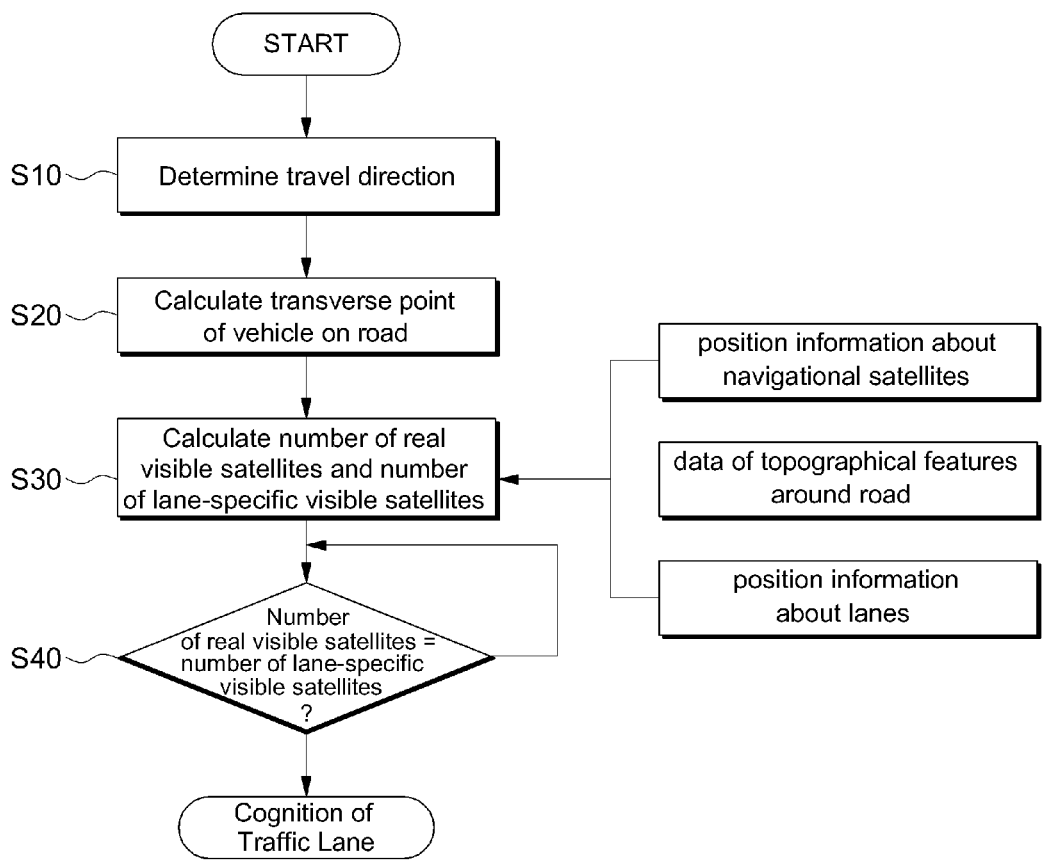
FIG. 3 is a flowchart showing a method of recognizing the traffic lane of a vehicle according to an exemplary embodiment of the present invention.

FIG. 3 is a flowchart showing a method of recognizing the traffic lane of a vehicle according to an exemplary embodiment of the present invention.

A travel direction is determined using satellite navigation information received from the satellite navigation device 110 and road information of the electronic map 120 (S10). This process is performed in the case of a road having two-way lanes as in FIG. 2. The process S10 of determining a travel direction is performed to reduce a range of lane recognition by half in the case of the two-way lanes. For example, in the case of a two-way four-lane road, when the travel direction is determined, only one of the one-way two lanes, i.e. left and right lanes, is recognized. As such, the range of the recognition is reduced from the four lanes to the two lanes by half.

The process S10 of determining a travel direction can be expressed by Equation 1 below.

$$D = f(P_{t-1}, P_{t-2}, R\_data) \quad \text{Equation 1}$$

where $P_{t-1}$ and $P_{t-2}$ are the position information of the vehicle prior to one epoch and two epochs. Here, the epoch may be defined as a period of time for calculation the position of the vehicle. $P_{t-1}$ and $P_{t-2}$ can be called the past position information of the vehicle, and R_data is the road information stored in the electronic map 120. Here, "t" is a period at which the position information is calculated, and is generally set to 1 sec. The period (t) may be differently set depending on a system.

The process S10 of determining a travel direction is performed to reduce the range of the lane recognition, but it is not an indispensable process. For example, the process S10 may be set so as to be performed only in the case of the two-way lanes, and not in the case of the one-way lanes.

Next, the position $P_t$ of a vehicle on a road is calculated using satellite navigation information of the satellite navigation device 110 and road information of the electronic map 120, thereby calculating a transverse point $L_p$ of the vehicle on the road (S20). The process of calculating the transverse point $L_p$ of the vehicle on the road can be by Equation 2 below.

$$L_p = f(P_t, D, R\_data) \quad \text{Equation 2}$$

where $P_t$ is the current position of the vehicle obtained using the satellite navigation device 110. The current position $P_t$ of the vehicle and its transverse point $L_p$ can be calculated in the form of coordinates.

On the basis of the calculated coordinates of the transverse point $L_p$, it is possible to obtain data of topographical features (buildings, roadside trees, etc.) located at the transverse point, as well as heights H of the topographical features located at the transverse point.

On the basis of the lane position information of the electronic map 120, the data of the topographical features located at the transverse point $L_p$, and the position information about the navigational satellites 200 received by the base station 300, the number of lane-specific visible satellites and the number of real visible satellites are calculated (S30).

The number of lane-specific visible satellites can be calculated on the basis of the position information about each roadway (lane) stored in the electronic map 120, the data of the topographical features located at the transverse point $L_p$, and the position information about the navigational satellites. The number of lane-specific visible satellites is calculated by projecting the current position $P_t$ of the vehicle on the lane of the road (e.g. in the case of two lanes, a left lane or a right lane). On the assumption that vehicles are located on respective lanes, the number of visible satellites corresponding to each lane is calculated using the position information about each lane stored in the electronic map 120.

The process of calculating the numbers $VS_1$ and $VS_2$ of lane-specific visible satellites with respect to two lanes can be expressed by Equation 3 below.

$$VS_1 = f(P_t, L_1, Sat\_Pos, GIS\_data)$$

$$VS_2 = f(P_t, L_2, Sat\_Pos, GIS\_data) \qquad \text{Equation 3}$$

where $L_1$ is the point where the position of the vehicle on the road is projected on the left lane, $L_2$ is the point where the position of the vehicle on the road is projected on the right lane, Sat_Pos is the position information of the navigational satellite 200, and GIS_data is the information about the surrounding terrain of the road stored in the electronic map 120, i.e. the data of the topographical features located at the transverse point $L_p$.

Hereinafter, the process of calculating the number $VS_1$ of visible satellites with respect to the left lane on the basis of the description above will be described.

Figure 4:
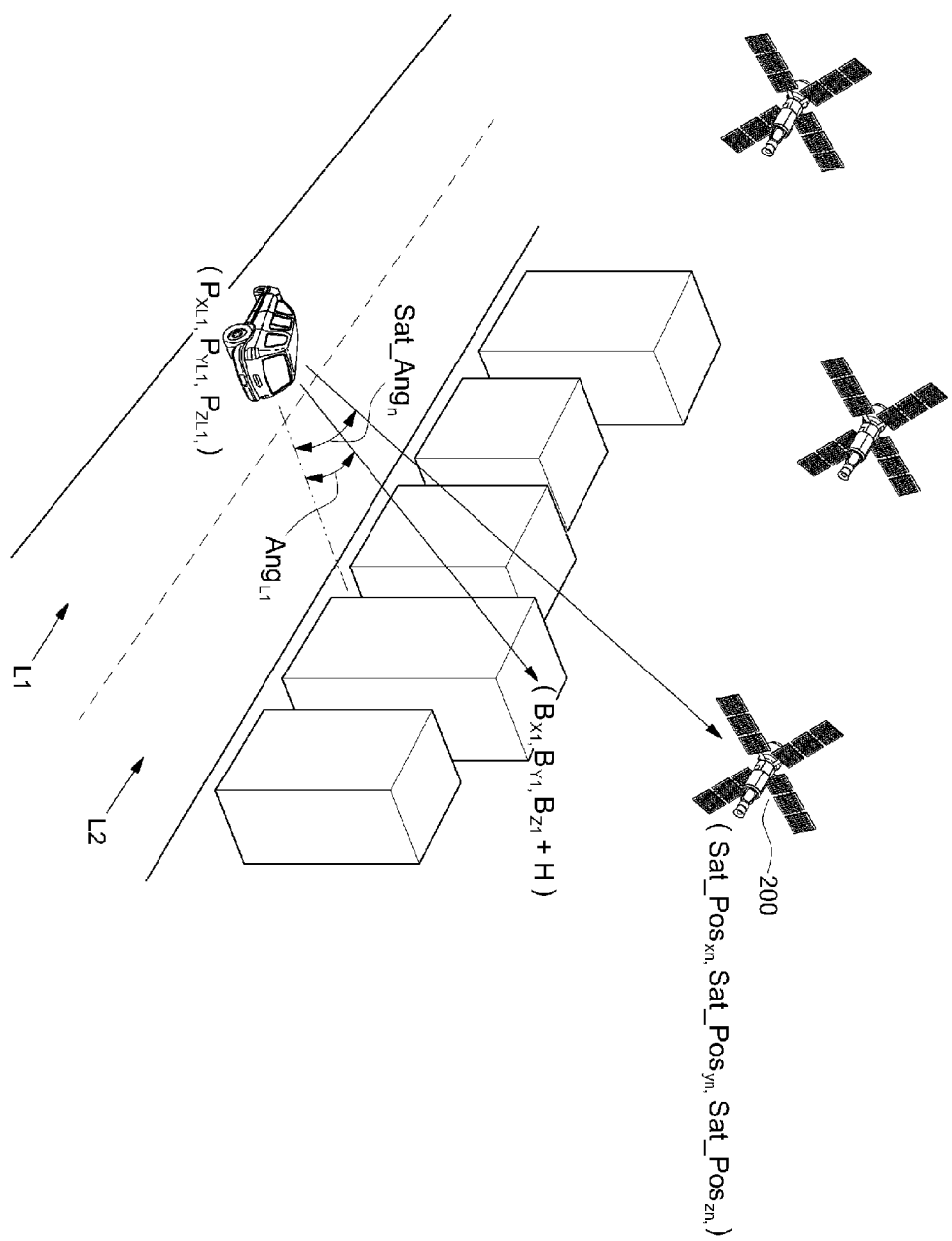
FIG. 4 is a conceptual view showing coordinates required to calculate the number of visible satellites.
Figure 5:
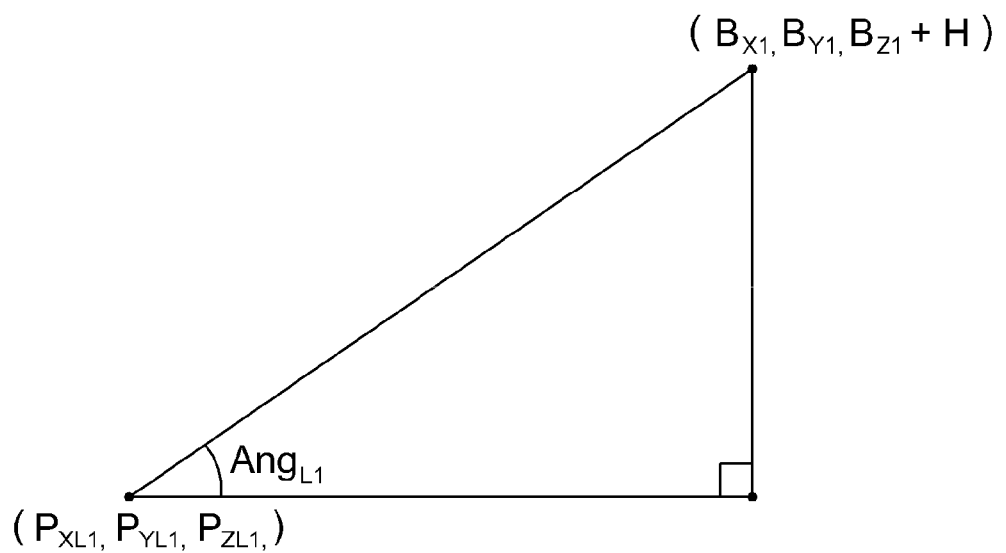
FIGS. 5 and 6 show a geometrical relationship required to calculate the number of visible satellites.
Figure 6:
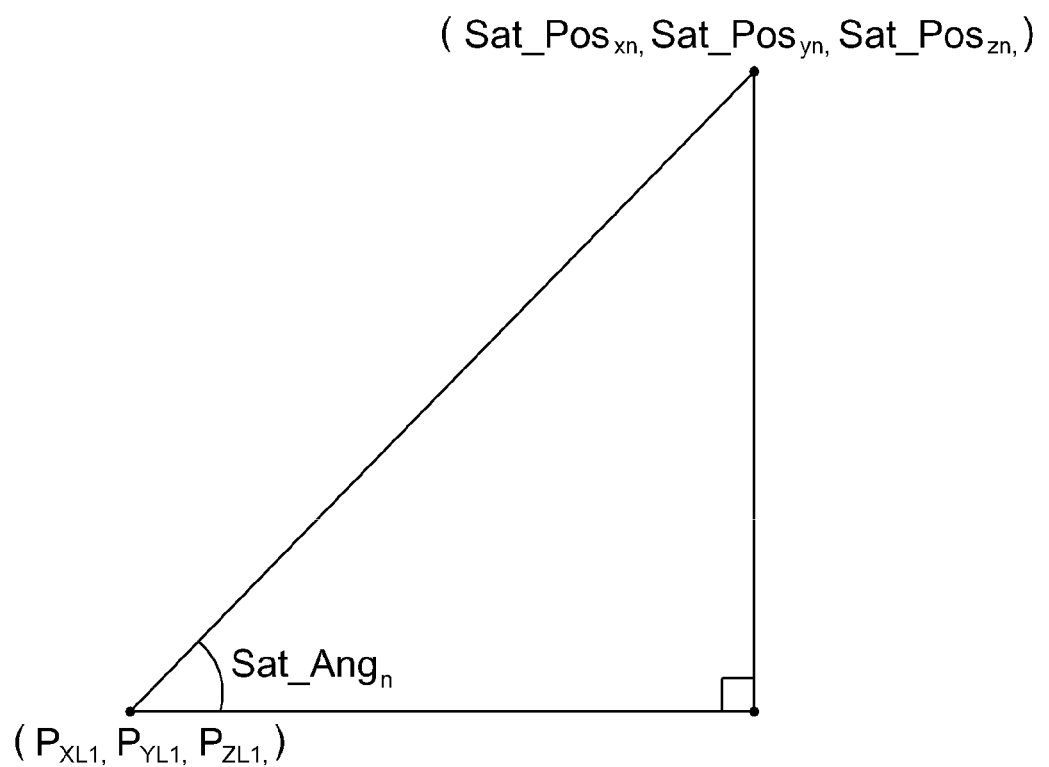

FIG. 4 is a conceptual view showing coordinates required to calculate the number of visible satellites, and FIGS. 5 and 6 show a geometrical relationship required to calculate the number of visible satellites.

Referring to FIG. 4, a position of the vehicle projected on the left lane may be expressed by coordinates ($P_{XL1}$, $P_{YL1}$, $P_{ZL1}$). A topographical feature (building, roadside tree, or the like) around the road located in a transverse direction of the vehicle may be expressed by coordinates ($B_{x1}$, $B_{Y1}$, $B_{Z1}$). A height of the topographical feature may be expressed by H.

Positions of the navigational satellites 200 transmitted from the base station are expressed by (Sat_Pos$_{xn}$, Sat_Pos$_{yn}$, Sat_Pos$_{zn}$). Here, n indicates the number of navigational satellites 200 transmitted from the base station.

Referring to FIG. 5, a lowest altitude angle "$Ang_{L1}$" of the navigational satellite 200 observed on the left lane can be expressed as follows:

$$Ang_{L1} = \tan^{-1} \frac{(B_{Z1} + H - P_{ZL1})}{\left(\sqrt{(B_{X1} - P_{XL1})^2 + (B_{Y1} - P_{YL1})^2}\right)}$$

In this manner, the lowest altitude angle "$Ang_{L1}$" of the navigational satellite 200 can be determined by the position ($P_{XL1}$, $P_{YL1}$, $P_{ZL1}$) of the vehicle, the position ($B_{X1}$, $B_{Y1}$, $B_{Z1}$) of the topographical feature located at the transverse point $L_p$, and the height H of the topographical feature.

Referring to FIG. 6, altitude angles "Sat_Ang$_n$" of the navigational satellites with respect to the position of the vehicle on the left lane can be expressed as follows:

$$Sat\_Ang_n = \tan^{-1} \frac{(Sat\_Pos_{zn} - P_{XL1})}{\left(\sqrt{(Sat\_Pos_{xn} - P_{XL1})^2 + (Sat\_Pos_{yn} - P_{YL1})^2}\right)}$$

In this manner, the altitude angles of the navigational satellites can be determined by the position ($P_{XL1}$, $P_{YL1}$, $P_{ZL1}$) of the vehicle and the positions (Sat_Pos$_{xn}$, Sat_Pos$_{yn}$, Sat_Pos$_{zn}$) of the navigational satellites.

Next, the number $VS_1$ of visible satellites on the left lane is calculated by comparing the lowest altitude angle "$Ang_{L1}$" of the navigational satellite 200 observed on the left lane with the altitude angles "Sat_Ang$_n$" of the navigational satellites with respect to the position of the vehicle on the left lane. That is, the number $VS_1$ of visible satellites can be expressed by $VS_1 = Num(Sat\_Ang_n > Ang_{L1})$, which means the number of navigational satellites satisfying $Sat\_Ang_n > Ang_{L1}$.

The number $VS_2$ of visible satellites on the right lane and the number RS of real visible satellites can be calculated by the same calculating method as described above.

The number $VS_2$ of visible satellites on the right lane need only be calculated on the basis of coordinates where the position of the vehicle is projected on the right lane.

The number RS of real visible satellites can be calculated on the basis of the current position information $P_t$ of the vehicle, the data of the topographical feature located at the transverse point $L_p$, and the position information of the navigational satellites. That is, the number RS of real visible satellites need only perform the calculating method as described above on the basis of the real coordinates $P_t$ of the vehicle.

Referring to FIG. 3 again, the lane along which the vehicle is traveling is recognized by comparison of the number RS of real visible satellites and the numbers $VS_1$ and $VS_2$ of lane-specific visible satellites calculated as described above (S40). For example, when the number $VS_1$ of visible satellites on the left lane is equal to the number RS of real visible satellites, the traffic lane of the vehicle will be the left lane. Further, when the number $VS_2$ of visible satellites on the right lane is equal to the number RS of real visible satellites, the traffic lane of the vehicle will be the right lane.

The process of recognizing the lane can be expressed by Equation 4 below.

$$L = f(RS, VS_1, VS_2) \qquad \text{Equation 4}$$

where $P_t$ is the current position of the vehicle obtained using the satellite navigation device 110. The current position $P_t$ of the vehicle and its transverse point $L_p$ can be calculated in the form of coordinates.

The process S30 of calculating the number of visible satellites and the process S40 of determining the traffic lane, both of which are as described above, are performed by the lane recognition unit 170.

According to the aforementioned method of recognizing the traffic lane using the navigation system, the position information of the navigational satellite and the spatial data of the surroundings of the road are used to recognize the traffic lane. As such, there are no restrictions in the aspects of installation and maintenance, and accurate lane recognition is possible without an influence on the weather conditions around the road.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of recognizing a traffic lane using a navigation system, the method comprising:
    calculating, by a controller, a position and a transverse point of a vehicle on a road using satellite navigation information and road information of an electronic map;
    calculating, by the controller, a number of lane-specific visible satellites and a number of real visible satellites on the basis of information about a lane position of the electronic map, data of topographical features located at the transverse point, and information about positions of navigational satellites received by a base station; and
    comparing, by the controller, the number of lane-specific visible satellites with the number of real visible satellites to recognize a lane along which the vehicle is traveling.

2. The method according to claim 1, wherein the calculating of the number of lane-specific visible satellites and the number of real visible satellites includes:
    calculating, by the controller, a lowest altitude angle of a visible navigational satellite;
    calculating, by the controller, altitude angles of the navigational satellites with respect to the vehicle; and
    comparing, by the controller, the lowest altitude angle of the visible navigational satellite with the altitude angles of the navigational satellites.

3. The method according to claim 2, wherein the number of lane-specific visible satellites is a number of the navigational satellites having altitude angles greater than the calculated lowest altitude angle.

4. The method according to claim 2, wherein:
    the lowest altitude angle is determined, by the controller, by a position of the vehicle, a position of the topographical feature located at the transverse point, and a height of the topographical feature; and
    the altitude angles of the navigational satellites are determined, by the controller, by the position of the vehicle and positions of the navigational satellites.

5. The method according to claim 2, wherein the number of lane-specific visible satellites is calculated, by the controller, by projecting a position of the vehicle on each lane of the road.

6. The method according to claim 1, wherein, when the number of lane-specific visible satellites and the number of real visible satellites are equal to each other by comparison, the lane is recognized, by the controller, as the traffic lane.

7. The method according to claim 1, wherein the road includes two-way lanes, and further comprising determining, by the controller, a travel direction of the vehicle using information about a past position of the vehicle and the road information.

8. A navigation system comprising:
    an electronic map in which information about roads and spatial data of topographical features around roads are stored;
    a satellite navigational device that calculates a position and a transverse point of a vehicle on the road using satellite navigation information and the road information;
    a radio communication unit that receives information about positions of the navigational satellites from a base station; and
    a lane recognition unit that calculates a number of lane-specific visible satellites and a number of real visible satellites on the basis of information about a lane position of the electronic map, spatial data of the topographical feature located at the transverse point, and position information of navigational satellites, and that compares the number of lane-specific visible satellites with the number of real visible satellites to recognize a lane along which the vehicle is traveling.

9. The navigation system according to claim 8, wherein the lane recognition unit determines a travel direction of the vehicle using information about a past position of the vehicle and the road information when the road include two-way lanes.

10. The navigation system according to claim 8, further comprising a display unit or a sound output unit that outputs guide information about lane changing on the basis of a result of the lane recognition of the lane recognition unit.

* * * * *